(12) United States Patent
Suzuki (10) Patent No.: US 8,329,279 B2
(45) Date of Patent: Dec. 11, 2012

(54) ELECTROOPTIC APPARATUS

(75) Inventor: Katsumi Suzuki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/325,393

(22) Filed: Dec. 14, 2011

(65) Prior Publication Data

US 2012/0086899 A1  Apr. 12, 2012

Related U.S. Application Data

(62) Division of application No. 12/212,040, filed on Sep. 17, 2008, now Pat. No. 8,097,294.

(30) Foreign Application Priority Data

Oct. 30, 2007 (JP) ................................. 2007-281394

(51) Int. Cl.
*G02F 1/1337* (2006.01)

(52) U.S. Cl. ........................... 428/78; 349/123; 359/254

(58) Field of Classification Search .................... 428/78, 428/77; 349/123; 359/254
See application file for complete search history.

(56) References Cited

U.S. PATENT DOCUMENTS

| | | | |
|---|---|---|---|
| 7,601,386 B2 | 10/2009 | Masuda | |
| 2001/0019133 A1 | 9/2001 | Konuma et al. | |
| 2002/0067400 A1 | 6/2002 | Kawase et al. | |
| 2002/0125817 A1 | 9/2002 | Yamazaki et al. | |
| 2003/0011727 A1* | 1/2003 | Kiguchi et al. | 349/106 |
| 2003/0043098 A1 | 3/2003 | Aoyama et al. | |
| 2004/0131861 A1 | 7/2004 | Chae et al. | |
| 2006/0244808 A1 | 11/2006 | Miura | |
| 2007/0120931 A1 | 5/2007 | Wang et al. | |

FOREIGN PATENT DOCUMENTS

| | | |
|---|---|---|
| CN | 1933101 A | 3/2007 |
| JP | 2003-126760 A | 5/2003 |
| JP | 2006-289239 A | 10/2006 |
| JP | 2007-144418 A | 6/2007 |
| KR | 2007-0055360 A | 5/2007 |

* cited by examiner

*Primary Examiner* — Brent O'Hern
(74) *Attorney, Agent, or Firm* — Global IP Counselors, LLP (57) ABSTRACT

An electrooptic apparatus includes an electrooptic material interposed between a pair of substrates, and a film formed above each of surfaces of the substrates facing the electrooptic material. The film is formed by a method including (a) forming a frame-shaped partition in an application area on the substrate, the partition having a side surface facing a center of the application area, (b) applying the material liquid to the application area, and (c) drying the material liquid. In step (a), the partition is formed so that a distance between the side surface of the partition and the center is smaller than a distance between an outer edge of the application area and the center, and so that a height of the partition is smaller than a film thickness of the material liquid at a time when the material liquid is applied and is larger than a thickness of the dried film.

5 Claims, 6 Drawing Sheets

ELECTROOPTIC APPARATUS

CROSS-REFERENCE TO RELATED APPLICATIONS

This application is a divisional application of U.S. patent application Ser. No. 12/212,040 filed on Sep. 17, 2008, now U.S. Pat. No. 8,097,294 issued on Jan. 17, 2012. The entire disclosure of U.S. patent application Ser. No. 12/212,040 is hereby incorporated herein by reference. This application claims priority to Japanese Patent Application No. 2007-281394 filed on Oct. 30, 2007. The entire disclosure of Japanese Patent Application No. 2007-281394 is hereby incorporated herein by reference.

BACKGROUND

1. Technical Field

The present invention relates to a film forming method and an electrooptic apparatus.

2. Related Art

There has been known a technology for, when applying a solution to a substrate, preventing the film thickness of a peripheral area of a pattern of the solution from becoming larger than those of other areas of the pattern. This technology is intended to spray a larger amount of the solution to areas of the substrate inside the edge of the substrate in the width direction from a nozzle than to the edge (for example, see JP-A-2006-289239).

However, if the amount of the solution to be applied to the edge of the substrate is reduced according to the above-described related art, the peripheral area of the pattern of the solution is more apt to be dried than the central area of the pattern. Thus, when the pattern is dried, the concentration of the solution in the peripheral area of the pattern becomes higher than that in the central area thereof. A problem here is that such a concentration gradient in the pattern causes a solvent in the solution to move from the central area of the pattern to the peripheral area thereof so as to compensate for the gradient thereby making the thickness of the peripheral area larger than those of other areas, contrary to expectations.

Figure 8A:
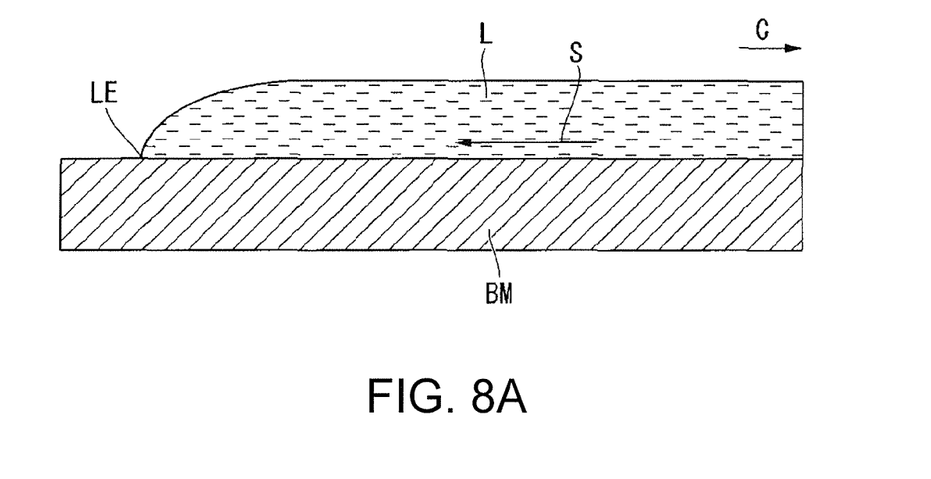
FIGS. 8A and 8B are sectional views showing a related-art method for forming an alignment film.
Figure 8B:
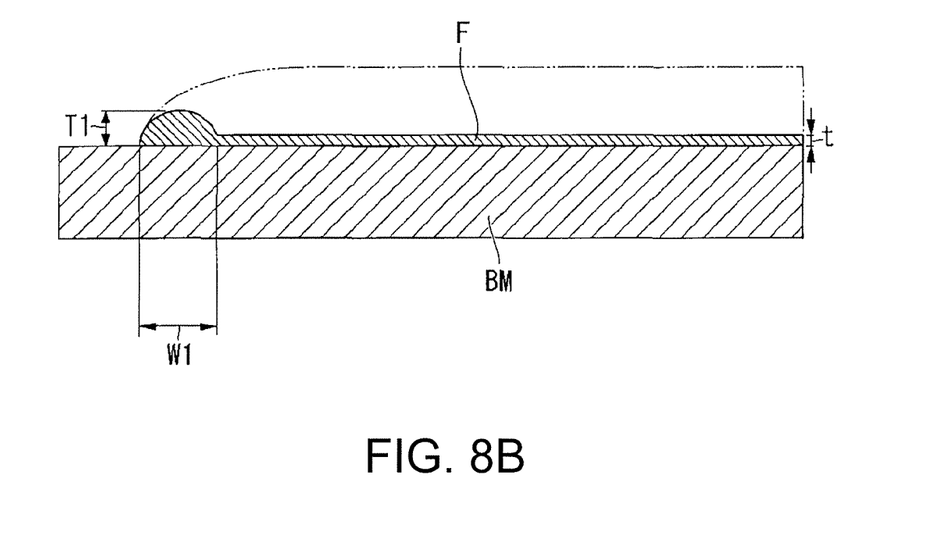

For example, as shown in FIG. 8A, if a material liquid L is applied to a base material BM and then dried, the concentration of a dissolved substance in the material liquid L at an outer edge LE of the material liquid L becomes higher than the concentration of the dissolved substance in the center C of the material liquid L, since the outer edge LE is more apt to be dried than the center C. Then, as shown by an arrow S, a solvent in the material liquid L moves toward the outer edge LE so as to compensate for the concentration gradient. Thus, as shown in FIG. 8B, a thickness T1 of the outer edge of a film F becomes larger than a thickness t of other areas of the film F. If the thickness t of the film F is, for example, in the range of approximately 0.3 to 1.2 µm, the thickness T1 of the outer edge is in the range of approximately 3 to 5 µm. A width W1 of the outer edge as described above is, for example, approximately 1 mm or less.

Also, if a film form on a substrate of an electrooptic apparatus such as a liquid crystal apparatus is thicker in a peripheral area thereof, a display failure may occur in the electrooptic apparatus thereby reducing the display quality.

SUMMARY

An advantage of the invention is to provide a film forming method that prevents a solvent in a solution from moving to a peripheral area of the solution when forming a film so that the film thickness of the peripheral area does not become larger than that of other areas of the solution as well as to provide an electrooptic apparatus with high display quality.

According to a first aspect of the invention, an electrooptic apparatus includes a pair of substrates opposed to each other, an electrooptic material interposed between the substrates, and a film formed above each of surfaces of the substrates facing the electrooptic material. The film is formed by a method for forming a film by applying a material liquid to an application area of each of the substrates and drying the applied material liquid, the method including (a) forming a frame-shaped partition in the application area, the partition having a side surface facing a center of the application area, (b) applying the material liquid to the application area, and (c) drying the material liquid. In step (a), the partition is formed so that a distance between the side surface of the partition and the center is smaller than a distance between an outer edge of the application area and the center, and so that a height of the partition is smaller than a film thickness of the material liquid at a time when the material liquid is applied and is larger than a thickness of the dried film.

If the partition is formed in this way and then the material liquid for the film is applied to the application area on the base material and then dried, the film thickness of the material liquid is gradually reduced due to the evaporation of a solvent in the material liquid. Then, the height of the partition that has been immersed in the material liquid since the application of the material liquid becomes equal to the film thickness of the material liquid with the lapse of time so that the top of the partition reaches the surface of the material liquid. Thus, the material liquid is divided into an area outside the partition and close to the outer edge of the application area and an area surrounded by the partition and close to the center of the application area. As the solvent in the material liquid is further evaporated, the film thickness of the material liquid becomes smaller than the height of the partition and the concentration of a dissolved substance in the material liquid is increased. In this case, areas of the material liquid closer to the outer edge of the application area are more apt to be dried and areas thereof closer to the center of the application area are less apt to be dried. For this reason, the concentration of the dissolved substance in a peripheral area of the material liquid becomes higher than that in a central area thereof so that a concentration gradient occurs between the peripheral area and central area of the material liquid. However, the peripheral area of the material liquid has been separated from the central area thereof by the partition so that the movement of the solvent from the central area of the material liquid where the concentration of the dissolved substance is low to the peripheral area thereof where the concentration of the dissolved substance is high is restricted by the partition. Therefore, the solvent in the material liquid is prevented from moving from the central area of the material liquid to the peripheral area thereof when a film is formed so that the film thickness of the peripheral area does not become larger than that of other areas. Thus, the leveling time for securing the flatness of the film after the material liquid is applied is sufficiently secured so that the flatness is improved.

According to this configuration, the film formed above each of the surfaces of the substrates opposed to the electrooptic material is a flat film with a uniform thickness. As a result, the distance between the substrates is made uniform so that the display quality of the electrooptic apparatus is improved.

In the electrooptic apparatus according to the first aspect of the invention, in step (a), the partition is preferably formed in multiple layers from the center toward the outer edge.

If the partitions are formed in this way, the material liquid is divided into multiple areas between the center and the outer edge of the application area in the drying step, unlike a case where a single partition is formed. Thus, the extent to which the peripheral area of the material liquid L is apt to be dried and the extent to which the central area thereof is apt to be dried are brought closer to each other. This prevents occurrence of a concentration gradient between the peripheral areas and central areas of the material liquid. As a result, the solvent in the material liquid is more effectively prevented from moving from the peripheral areas of the material liquid to the central areas thereof when a film is formed. This makes the film thickness more uniform thereby more reliably preventing the film thickness of the peripheral areas from becoming larger than that of other areas.

In the electrooptic apparatus according to the first aspect of the invention, in step (a), the partition is preferably formed by applying the material liquid and then drying the applied material liquid.

If the partition is formed in this way, the partition is formed using a material identical to a material for the film as well as using an apparatus and a method identical to those used when the film is formed. Accordingly, any additional apparatus or material is not required to form the partition. This makes it easy to form the film thereby improving the productivity.

In the electrooptic apparatus according to the first aspect of the invention, in step (b), the material liquid is preferably applied using a droplet discharge method.

By using a droplet discharge method, the material liquid is applied to the application area on the base material uniformly and accurately.

In the electrooptic apparatus according to the first aspect of the invention, the film is preferably an alignment film for controlling alignment of a liquid crystal molecule.

Thus, the thickness of the alignment film is made uniform so that the quality of a product using the alignment film is improved.

BRIEF DESCRIPTION OF THE DRAWINGS

The invention will be described with reference to the accompanying drawings, wherein like reference numerals designate like elements.

DESCRIPTION OF EXEMPLARY EMBODIMENTS

Now, a first embodiment of the invention will be described with reference to the accompanying drawings. Specifically, an active matrix liquid crystal apparatus including thin film transistors (TFTs) as pixel switching elements will be described as an example of an electrooptic apparatus. Note that layers and elements are scaled up or down in these drawings as appropriate so that the layers and elements have recognizable sizes.

Liquid Crystal Apparatus

Figure 1A:
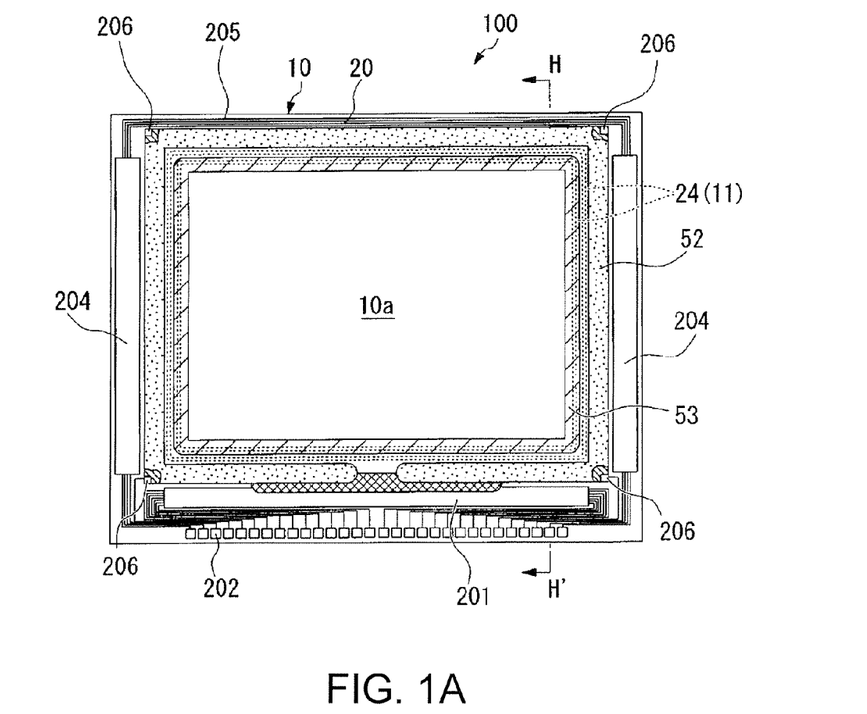
FIG. 1A is plan view of a liquid crystal apparatus according to a first embodiment of the invention.
Figure 1B:
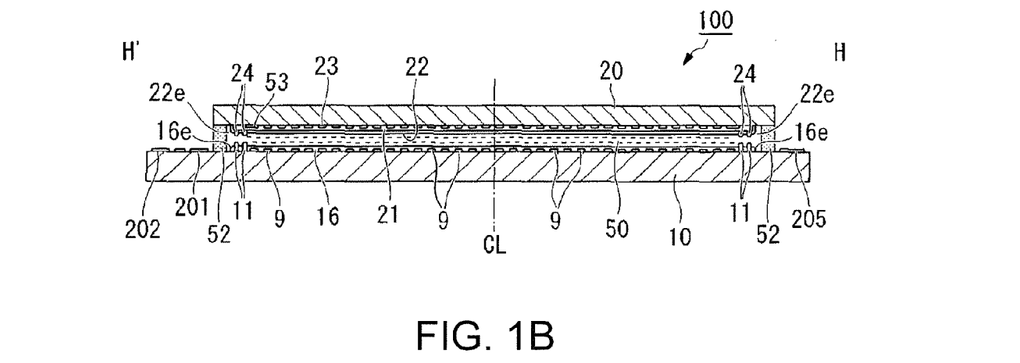
FIG. 1B is a sectional view taken along line H-H' of FIG. 1A.
Figure 2:
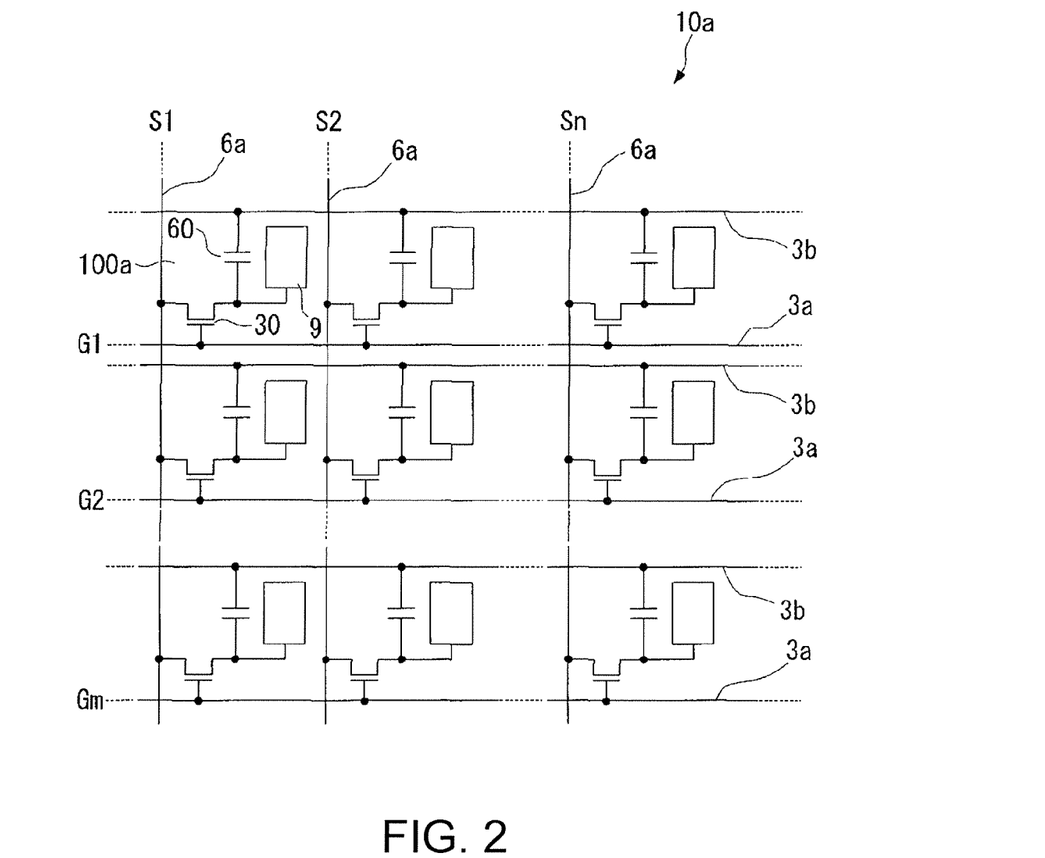
FIG. 2 is a diagram showing an equivalent circuit of the liquid crystal apparatus according to the first embodiment of the invention.

FIG. 1A is a plan view of a liquid crystal apparatus and elements thereof according to this embodiment seen from a counter substrate. FIG. 1B is a sectional view taken along line H-H' of FIG. 1A. FIG. 2 is an equivalent circuit showing elements, wiring, and the like in multiple pixels formed into a matrix in a pixel display area of the liquid crystal apparatus.

As shown in FIG. 1A, a liquid crystal apparatus 100 includes a TFT array substrate 10 and a counter substrate 20, which are bonded together by a sealant 52. The sealant 52 is provided along the perimeter of the counter substrate 20 in the form of a frame that is approximately rectangular in a plan view. Liquid crystal is sealed in an area surrounded by the sealant 52. A shading film 53 made of a shading material is formed immediately inside the sealant 52 in the form of a frame that is approximately rectangular in a plan view. An area inside the shading film 53 is an image display area 10a. A data line drive circuit 201 and an external circuit implementation terminal 202 are formed along one edge (bottom edge in the drawing) of the TFT array substrate 10 outside the sealant 52. Scan line drive circuits 204 are formed along two edges of the TFT array substrate 10 adjacent to this edge. Multiple wiring lines 205 for connecting the scan line drive circuits 204 located on both sides of the image display area 10a are formed along the remaining edge (top edge in the drawing) of the TFT array substrate 10. Inter-substrate conductive materials 206 serving as conductive particles for establishing continuity between the TFT array substrate 10 and counter substrate 20 are disposed at the corners of the counter substrate 20.

As shown in FIG. 1B, the TFT array substrate 10 and counter substrate 20 opposed thereto are bonded together by the sealant 52. The liquid crystal layer 50 is sealed in a space surrounded by the TFT array substrate 10, counter substrate 20, and sealant 52. Pixel electrodes 9 are formed on the inner surface (surface adjacent to the liquid crystal layer 50) of the TFT array substrate 10. Also, an alignment film 16 for controlling the alignment of liquid crystal particles is formed in such a manner that the alignment film 16 covers the pixel electrodes 9. On the other hand, a shading film 23 is formed in the form of a lattice in a plan view on the inner surface (surface adjacent to the liquid crystal layer 50) of the counter substrate 20 in such manner that the shading film 23 is opposed to data lines, scan lines, and pixel switching TFTs (to be described later) formed on the TFT array substrate 10. Also, a counter electrode 21 is formed above the entire inner surface of the counter substrate 20 in such a manner that the counter electrode 21 covers the shading film 23. Further, an alignment film 22 is formed in such a manner that it covers the counter electrode 21. For example, the alignment films 16 and 22 are made of polyimide and with thicknesses of approximately 0.3 to 1.2 μm.

As shown in FIG. 1A, multiple convex partitions 11 and 24 are formed along outer edges 16e and 22e of the alignment film 16 and 22, which is formed in the form of approximately a rectangle in a plan view, on the TFT array substrate 10 and counter substrate 20 inside the sealant 52 (on the side of the sealant 52 adjacent to the image display area 10a). Note that in FIG. 1B, only two each of the multiple partitions 11 and 24 are shown for clarity and the other partitions 11 and 24 are omitted.

The partitions 11 and 24 are formed in multiple layers between the centers (centerline CL) of the alignment films 16 and 22 and the outer edges 16e and 22e thereof. Also, the partitions 11 and 24 are formed so that the side surfaces opposed to the centerline CL, of the outmost or second outmost partitions 11 and 24 are closer to the centers (center line CL) than the outer edges 16e and 22e of the alignment films 16 and 22 and so that the heights of the partitions 11 and 24 are equal or larger than the thicknesses of the alignment films 16 and 22.

As shown FIG. 2, multiple pixels 100a are formed in the form of a matrix in the image display area 10a of the liquid crystal apparatus 100 and each include a TFT 30 for pixel switching. Coupled to the sources of the TFTs 30 are data lines 6a for providing pixel signals S1, S2, . . . , Sn. The pixel signals S1, S2, . . . , Sn may be provided to the data lines 6a in this order using the line sequential method or may be provided to groups of multiple adjacent data lines 6a. Coupled to the gates of the TFT 30 are scan lines 3a that sequentially apply scan signals G1, G2, . . . , Gm to the scan lines 3a in the form of pulses at predetermined timings using the line sequential method.

The pixel electrodes 9 are coupled to the drains of the TFTs 30 and write the pixel signals S1, S2, . . . , Sn provided by the data lines 6a into the pixels at predetermined timings by turning on the TFTs 30 serving as switching elements for a given time. The predetermined levels of pixel signals S1, S2, . . . , Sn written into liquid crystal via the pixel electrode 9 as described above are held between the pixel electrodes 9 and the counter electrode 21 above the counter substrate 20 shown in FIG. 1B for a given time. Also, in order to prevent the held pixel signals S1, S2, . . . , Sn from leaking, a storage capacitance 60 is provided in parallel with a liquid crystal capacitance formed between each pixel electrode 9 and the counter electrode 21. Each storage capacitance 60 is constituted by a part of a corresponding capacitance line 3b.

Alignment Film Forming Method

Next, a film forming method according to this embodiment will described using a method for forming the alignment films 16 and 22 of the liquid crystal apparatus 100 as an example. Specifically, a method for forming the alignment film 16 by applying a material liquid to the TFT array substrate 10 and drying the material liquid will be described. Also, a process of forming the alignment film 16 will be mainly described and the description of other processes will be omitted as appropriate. Note that elements other than the alignment film 16 may be formed using a publicly known method.

Partition Forming Step

First, the above-described TFTs 30, scan lines 3a, capacitance lines 3b, data line 6a, pixel electrodes 9, and the like are formed on the TFT array substrate 10. Then, the partitions 11 each taking the shape of a rectangular frame in a plan view are formed.

Figure 3:
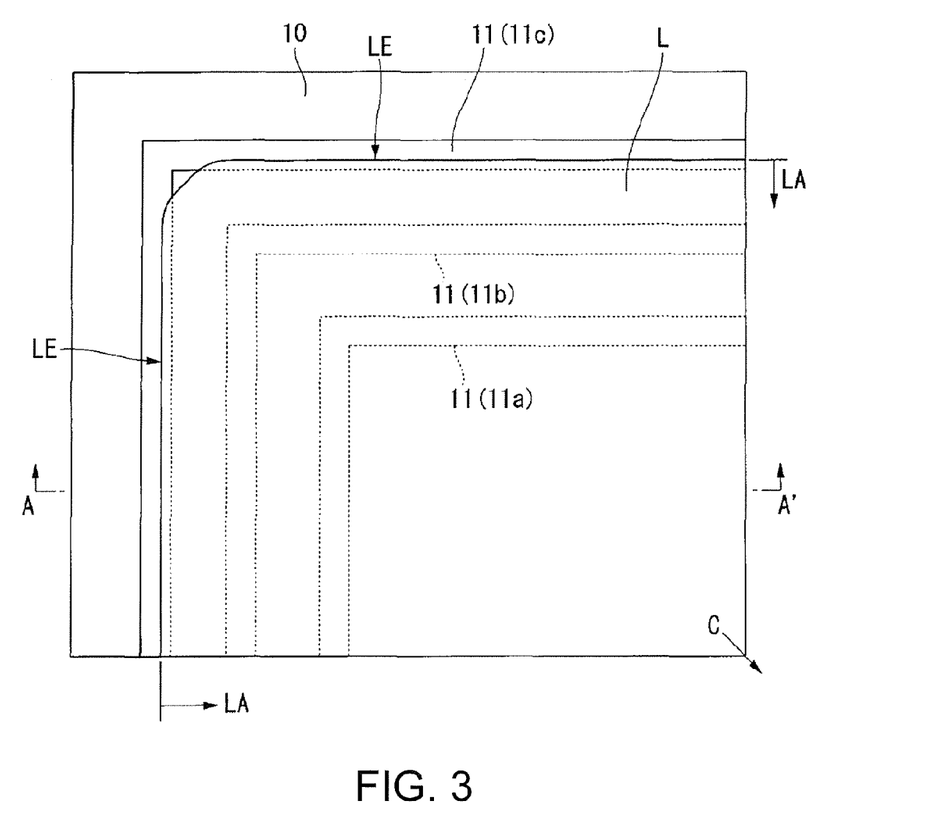
FIG. 3 is a partial enlarged plan view showing a method for forming an alignment film according to the first embodiment.
Figure 4:
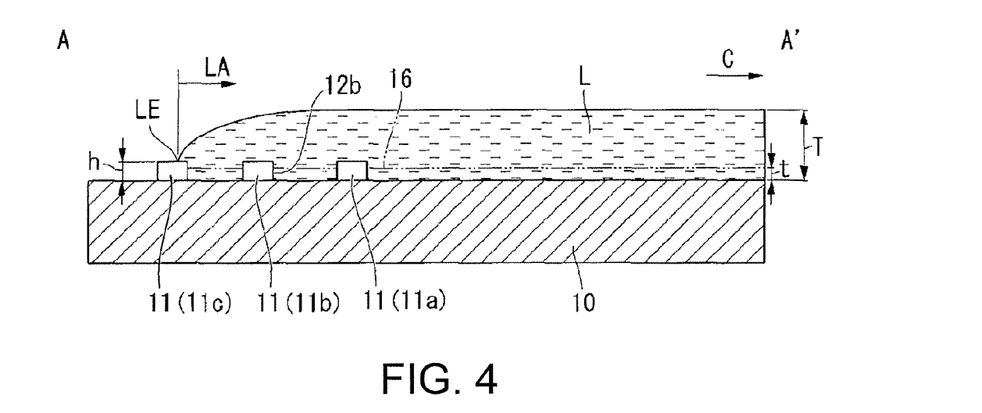
FIG. 4 is a sectional view taken along line A-A' of FIG. 3.

As shown in FIGS. 3 and 4, the multiple partitions 11 are formed on the periphery of an application area LA to which the material liquid L including a polyimide as the material of the alignment film 16 is applied. A center C of the application area LA approximately agrees with the center of the image display area 10a of the TFT array substrate 10, while an outer edge LE of the application area LA is defined along the inner edge of the sealant 52 to be formed in a later process.

The droplet discharge method may be used as a method for forming the partitions 11. Specifically, first, the material liquid L for the alignment film 16 is discharged as droplets from a drop discharge head (not shown) and applied to an area on the TFT array substrate 10 where the partitions 11 are to be formed. Then, the applied material liquid L is dried so that the partitions 11 are formed. Thus, the partitions 11 made of the material liquid L like the alignment film are formed. In this case, after the material liquid L is applied and then dried, the material liquid L may be processed by etching or the like so that the partitions 11 are formed into a desired shape or a pattern.

In this embodiment, the three partitions 11, that is, a first partition 11a, a second partition 11b, and a third partition 11c are formed in three layers from the center C of the application area LA toward the outer edge LE thereof using the droplet discharge method. In this case, the outmost third partition 11c is formed so that the outer edge LE of the application are LA is positioned on the third partition 11c, and the second partition 11b immediately inside the third partition 11c is formed so that a side surface 12b of the second partition 11b is closer to the center C of the application area LA than the outer edge LE thereof.

The partitions 11 are formed so that a height h thereof is smaller than the thickness T of the alignment film 16 at the time when the material liquid L for the alignment film 16 is applied and is larger than the thickness t of the alignment film 16 at the time when the alignment film 16 has been formed. For example, the thickness T at the time when the material liquid L is applied is in the range of approximately 2 to 3 μm and the thickness t of the dried alignment film 16 is in the range of approximately 0.3 to 1.2 μm. Also, the partitions 11 are formed so that the height h thereof is smaller than the cell gap of the liquid crystal 100.

Material Liquid Application Step

Next, the material liquid L is applied to the application area LA, for example, using the droplet discharge method using an inkjet head. Thus, as shown in FIGS. 3 and 4, the first partition 11a and second partition 11b are immersed in the material liquid L. Also, the outer edge LE of the material liquid L comes into contact with the third partition 11c in such a manner that the outer edge LE is positioned on the third partition 11c. For example, the concentration of a dissolved substance, such as polyimide, in the material liquid L at the time of application is approximately 5%.

Drying Step

Next, the material liquid L in the application area LA is dried. At that time, the film thickness T of the material liquid L is gradually reduced due to the evaporation of a solvent in the material liquid L. Then, the height h of the first partition 11a and second partition 11b that have been immersed in the material liquid L since the application of the material liquid L becomes equal to the thickness T of the material liquid L with the lapse of time so that the tops of these partitions reach the surface of the material liquid L.

Figure 5:
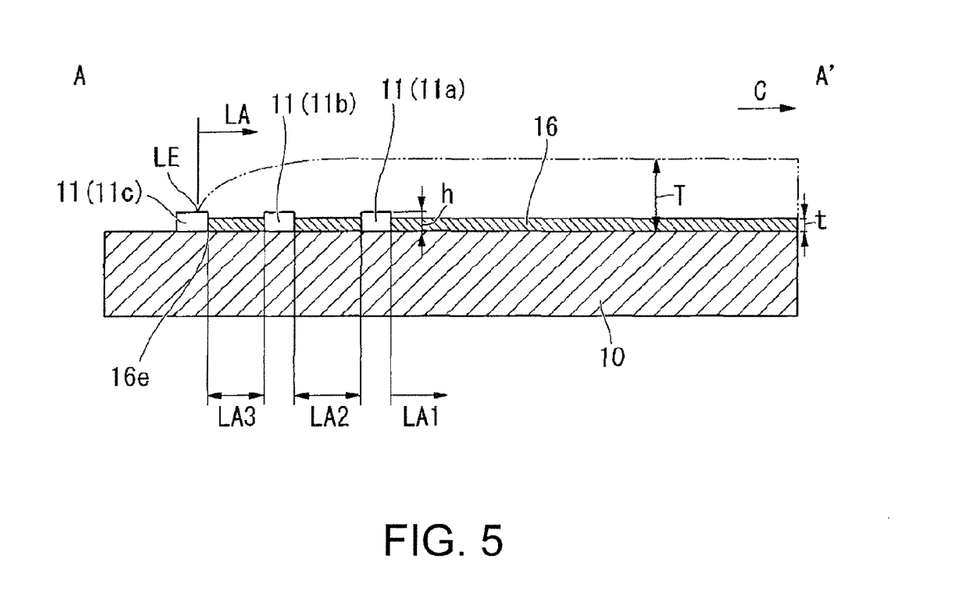
FIG. 5 is a sectional view taken along line A-A' of FIG. 3.

Thus, as shown in FIG. 5, the material liquid L is divided into multiple areas, LA1, LA2, and LA3, by the first partition 11a and second partition 11b.

As the solvent in the material liquid L is further evaporated, the thickness T of the material liquid L becomes smaller than the height h of the partitions 11 and the concentration of the dissolved substance in the material liquid L is increased. In this case, the material liquid L is more apt to be dried in the area LA3 close to the outer edge LE of the application area LA and less apt to be dried in the area LA1 close to the center C of the application area LA. For this reason, the concentration of the dissolved substance in the area LA3 of the material liquid L becomes higher than that in the area LA1 so that a concentration gradient occurs between areas close to the outer edge LE of the application area LA and areas close to the center C thereof. However, the areas of the material liquid L closer to the outer edge LE is separated from the areas thereof closer to the center C by the first partition 11a and second partition 11b so that the movement of the solvent from the areas LA1 and LA2 that are close to the center C and in which the concentration of the dissolved substance in the material liquid L is low to the areas LA2 and LA3 that are close to the outer edge LE and in which the concentration of the dissolved substance is high is restricted by the first partition 11a and second partition 11b.

Therefore, according to this embodiment, the solvent in the material liquid L is prevented from moving from areas close to the center C to areas close to the outer edge LE when the alignment film 16 is formed. Thus, the film thickness t of the periphery of the alignment film 16 is prevented from becoming larger than that of other areas thereof. As a result, the leveling time for securing the flatness after the material liquid L is applied is sufficiently secured so that the flatness of the alignment film 16 is improved.

Also, the multiple partitions 11 are formed in multiple layers. Thus, in the drying step, the material liquid L is divided into the multiple areas, LA1, LA2, and LA3, between the center C and the outer edge LE of the application area LA, unlike a case where the single partition 11 is formed. Thus, the extent to which the area of the material liquid L close to the outer edge LE is apt to be dried and the extent to which the area thereof close to the center C are brought closer to each other. This prevents occurrence of a concentration gradient between areas of the material liquid L close to the outer edge LE and areas thereof close to the center C. As a result, the solvent in the material liquid L is more effectively prevented from moving from the center C of the application area LA toward the outer edge LE thereof when the alignment film 16 is formed. Thus, the film thickness t is made more uniform and the film thickness t of the periphery is prevented from becoming larger than that of other areas.

Also, when the multiple partitions 11 are formed in multiple layers as described above, the outmost third partition 11c is formed in such a manner that the outer edge LE of the application area LA is positioned on the third partition 11c. Then, the material liquid L is applied so that the outer edge LE comes into contact with the third partition 11c. Thus, the outer edge LE of the material liquid L is prevented from exceeding the third partition 11c. Also, the outer edge 16e of the alignment film 16 is defined by the third partition 11c.

Also, the partitions 11 are formed using the material liquid L for the alignment film 16. That is, the partitions 11 are formed using the apparatus and method used when the alignment film 16 is formed. Accordingly, any additional apparatus or material is not required to form the partitions 11. This makes it easy to form the alignment film 16 thereby improving the productivity.

Also, the material liquid L is applied using the droplet discharge method. Thus, the material liquid L is applied to the application area LA on the TFT array substrate 10 uniformly and accurately.

Also, the alignment film 22 is formed on the counter substrate 20 using the above-described method for forming the alignment film 16. Thus, the thickness of the alignment film 22 is made uniform so that the flatness of the alignment film 22 is improved.

As described above, according to this embodiment, the flatness of the alignment film 16 is improved and the film thickness t is made uniform. This improves the quality of the alignment film 16. Accordingly, by using the alignment film 16, the quality of the liquid crystal apparatus 100 is improved. That is, the alignment film 16 formed on the surface of the TFT array substrate 10 close to the liquid crystal layer 50 is a flat film with the uniform film thickness t. As a result, the distance between the TFT array substrate 10 and counter substrate 20 is made uniform so that the display quality of the liquid crystal apparatus 100 is improved.

Second Embodiment

A second embodiment of the invention will now be described with reference to FIGS. 1 to 4 and FIG. 6. This embodiment is similar to the above-described first embodiment except that the single partition 11 is formed on the TFT array substrate 10. Accordingly, like elements are given like reference numerals and will not be described.

Partition Forming Process

Figure 6:
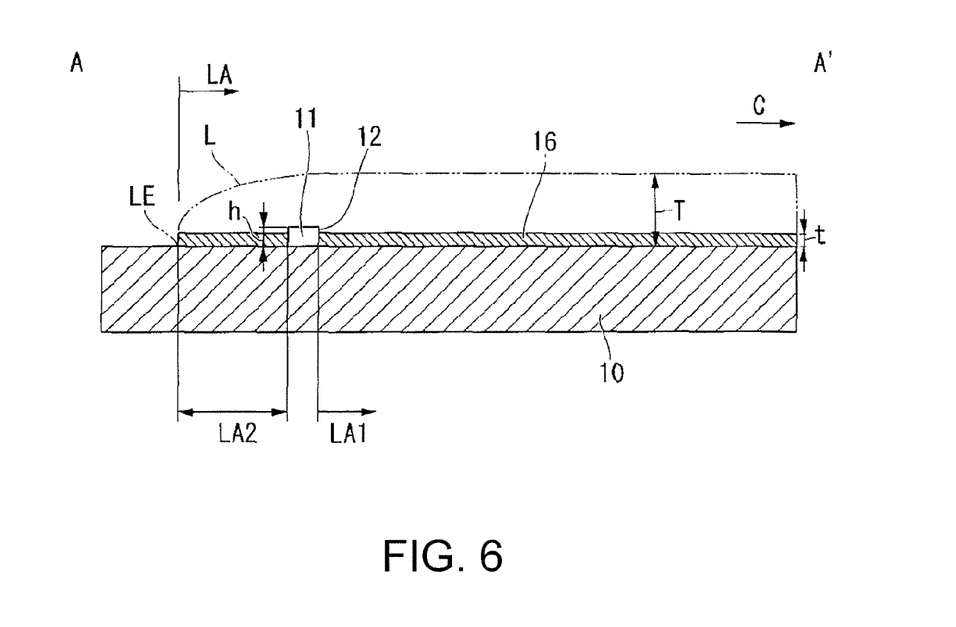
FIG. 6 is a sectional view corresponding to FIG. 5 according to a second embodiment of the invention.

As shown in FIG. 6, the single partition 11 is formed on the TFT array substrate 10. In this case, the partition 11 is formed so that a side surface 12 of the partition 11 opposed to the center C is closer to the center C of the application area LA than the outer edge LE thereof.

Material Liquid Application Process

Next, the material liquid L is applied to the application area LA like in the first embodiment.

Drying Process

Next, the material liquid L in the application area LA is dried like in the first embodiment. Thus, as shown in FIG. 6, the material liquid L is divided into the area LA1 close to the center C of the application area LA and the area LA2 close to the outer edge LE thereof by the partition 11.

As the solvent in the material liquid L is further evaporated, the concentration of the dissolved substance in the material liquid L in the area LA2 becomes higher than that in the area LA1. Thus, a concentration gradient occurs between the outer edge LE and center C of the application area LA. However, the area of the material liquid L close to the outer edge LE is separated from the area thereof close to the center C by the partition 11. Thus, the movement of the solvent from the area LA1 that is close to the center C and in which the concentration of the dissolved substance in the material liquid L is low to the area LA2 that is close to the outer edge LE and in which the concentration of the dissolved substance is high is restricted by the partition 11.

Therefore, according to this embodiment, an advantage similar to that obtained according to the first embodiment is obtained. Also, the partition is easily formed so that the productivity is improved.

Third Embodiment

A third embodiment of the invention will now be described with reference to FIGS. 1 to 4 and FIG. 7. This embodiment is similar to the second embodiment except that the width of the partition 11 is increased and the outer edge LE of the application area LA is formed on the partition 11. Accordingly, like elements are given like reference numerals and will not be described.

Partition Forming Process

Figure 7:
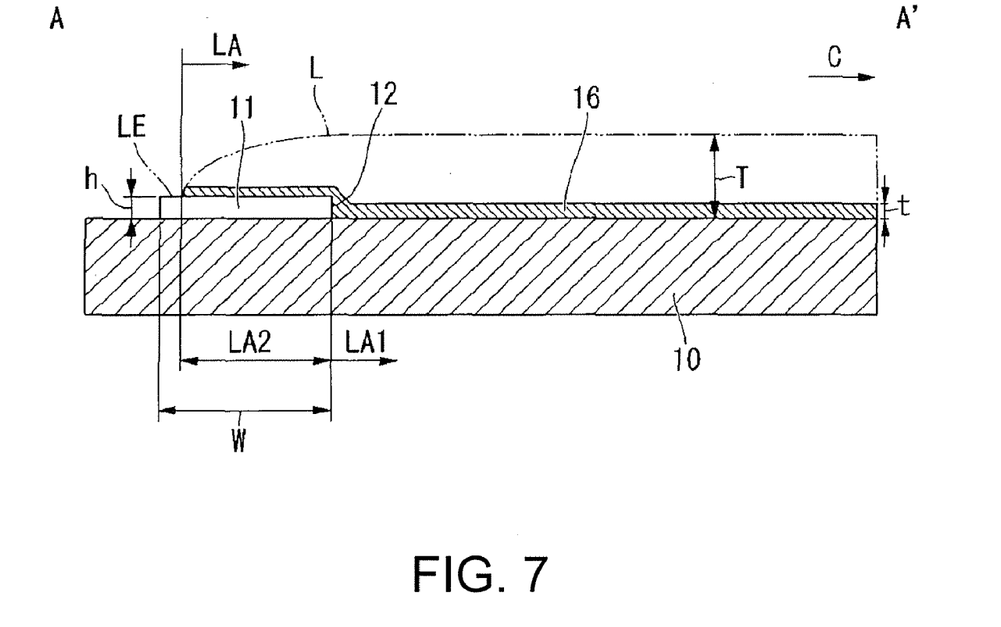
FIG. 7 is a sectional view corresponding to FIG. 5 according to a third embodiment of the invention.

As shown in FIG. 7, the single partition 11 is formed on the TFT array substrate 10 like in the second embodiment. In this case, the partition 11 is formed so that the side surface 12 of the partition 11 opposed to the center C is closer to the center C of the application area LA than the outer edge LE thereof. Also, the partition 11 is formed so that a width W thereof corresponds to the width of a peripheral area of the alignment film 16 that need be flattened. For example, the partition 11 with the width W of approximately 1.0 mm or less is formed.

Material Liquid Application Step

Next, the material liquid L is applied to the application area LA like in the second embodiment.

Drying Step

Next, the material liquid L in the application area LA is dried like in the second embodiment. Thus, the material liquid L is dried from a surface thereof close to the outer edge LA of the application area LA. Thus, the area LA2 between the side surface 12 of the partition 11 opposed to the center C and the outer edge LE is dried most quickly so that an alignment film is formed in the area LA2. At that time, areas of the material liquid L close to the TFT array substrate 10 in the area LA1 closer to the center C than the side surface 12 of the partition 11 have not been sufficiently dried and the solvent is left without evaporating. For this reason, the solvent attempts to move toward the outer edge LE where the concentration of the dissolved substance is high.

However, the side surface 12 of the partition 11 has been formed between the area LA1 and area LA2. Also, the area LA2 of the material liquid L has been dried so that the alignment film 16 has been formed. Thus, the movement of the solvent close to the TFT array substrate 10 is restricted by the side surface 12 of the partition 11 and the alignment film 16 in the area LA2.

Accordingly, according to this embodiment, the alignment film 16 is flattened like in the second embodiment.

The invention is not limited to the above-described embodiments and a film to be formed need not always be an alignment film. For example, a film that is required to be flat, such as a resist film or an inter-layer film for a liquid crystal apparatus may be formed using the film forming method according to the invention.

Also, a method for applying a material liquid for a partition and an alignment film is not limited to the droplet discharge method. For example, a material liquid may be applied using a dispenser or the like.

Also, a partition may be made of a material different from a material for a film. For example, a substrate may be processed by photolithography, etching, or the like. Also, in the process of forming wiring or TFTs on a substrate, a partition may be formed using a material for these elements. Thus, the partition is formed together with the wiring and TFTs so that the productivity is improved.

What is claimed is:

1. An electrooptic apparatus comprising:
a pair of substrates opposed to each other;
an electrooptic material interposed between the substrates;
a film formed in an application area on each of surfaces of the substrates facing the electrooptic material; and
a frame-shaped partition formed in the application area of each of the substrates, the partition having a side surface facing a center of the application area so that a distance between the side surface of the partition and the center is smaller than a distance between an outer edge of the application area and the center, a height of the partition being larger than a thickness of the film.

2. The electrooptic apparatus according to claim 1, wherein the partition includes multiple layers from the center toward the outer edge.

3. The electrooptic apparatus according to claim 1, wherein the partition is formed by applying a material liquid and then drying the applied material liquid.

4. The electrooptic apparatus according to claim 1, wherein the partition is formed by applying a material liquid using a droplet discharge method.

5. The electrooptic apparatus according to claim 1, wherein the film is an alignment film for controlling alignment of a liquid crystal molecule.

* * * * *